United States Patent
Yoshida et al.

(10) Patent No.: US 10,025,358 B2
(45) Date of Patent: Jul. 17, 2018

(54) DISPLAY DEVICE

(71) Applicant: FUJITSU LIMITED, Kawasaki-shi, Kanagawa (JP)

(72) Inventors: Hiroki Yoshida, Kawasaki (JP); Makoto Bando, Inagi (JP); Goki Yamaguchi, Kawasaki (JP); Daisuke Mihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 144 days.

(21) Appl. No.: 14/971,612

(22) Filed: Dec. 16, 2015

(65) Prior Publication Data
US 2016/0252937 A1    Sep. 1, 2016

(30) Foreign Application Priority Data
Feb. 27, 2015   (JP) ................. 2015-037916

(51) Int. Cl.
| | |
|---|---|
| *H05K 5/00* | (2006.01) |
| *G06F 1/20* | (2006.01) |
| *H04B 1/3827* | (2015.01) |
| *G06F 1/16* | (2006.01) |

(52) U.S. Cl.
CPC ............ *G06F 1/203* (2013.01); *G06F 1/1626* (2013.01); *G06F 1/1637* (2013.01); *H04B 1/3833* (2013.01)

(58) Field of Classification Search
CPC ...... G06F 1/203; G06F 1/1626; G06F 1/1637; H04B 1/3833
See application file for complete search history.

(56) References Cited

U.S. PATENT DOCUMENTS

| | | | | |
|---|---|---|---|---|
| 5,987,890 | A * | 11/1999 | Chiu ....................... | F25B 21/02 165/104.33 |
| 2014/0354570 | A1* | 12/2014 | Makinen ................ | G06F 3/041 345/173 |
| 2016/0091937 | A1* | 3/2016 | Shen ..................... | G06F 1/1626 361/679.54 |
| 2016/0282914 | A1* | 9/2016 | Saito .................. | H05K 7/20336 |

FOREIGN PATENT DOCUMENTS

| | | |
|---|---|---|
| JP | 2014-139501 | 7/2014 |
| JP | 2014-216610 | 11/2014 |

* cited by examiner

*Primary Examiner* — James Wu
*Assistant Examiner* — Hung Dang
(74) *Attorney, Agent, or Firm* — Fujitsu Patent Center

(57) ABSTRACT

A display device includes a plate-shaped display unit; a mounting unit disposed on a back surface side of the display unit, a direction normal to a back surface of the display unit being a thickness direction of the mounting unit; an erect portion that erects towards the back surface side of the display unit along a lateral side of the mounting unit, the erect portion protruding towards a display unit side in a greater manner than the mounting unit; and a plate material that opposes the back surface of the display unit and that is interposed between the display unit and the erect portion.

8 Claims, 20 Drawing Sheets

DISPLAY DEVICE

CROSS-REFERENCE TO RELATED APPLICATION

This application is based upon and claims the benefit of priority of the prior Japanese Patent Application No. 2015-037916, filed on Feb. 27, 2015, the entire contents of which are incorporated herein by reference.

FIELD

The embodiment discussed herein is related to a display device.

BACKGROUND

Conventionally, there is a display device that includes a plate-shaped display unit and a battery unit that is disposed on a back surface side of the display unit. Related technical literature includes Japanese Laid-open Patent Publication No. 2014-139501 and Japanese Laid-open Patent Publication No. 2014-216610, for example.

SUMMARY

In accordance with an aspect of the embodiments, a display device includes a plate-shaped display unit; a mounting unit disposed on a back surface side of the display unit, a direction normal to a back surface of the display unit being a thickness direction of the mounting unit; an erect portion that erects towards the back surface side of the display unit along a lateral side of the mounting unit, the erect portion protruding towards a display unit side in a greater manner than the mounting unit; and a plate material that opposes the back surface of the display unit and that is interposed between the display unit and the erect portion.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENT

Hereinafter, an embodiment of a technique disclosed in the present application will be described.

Figure 1:
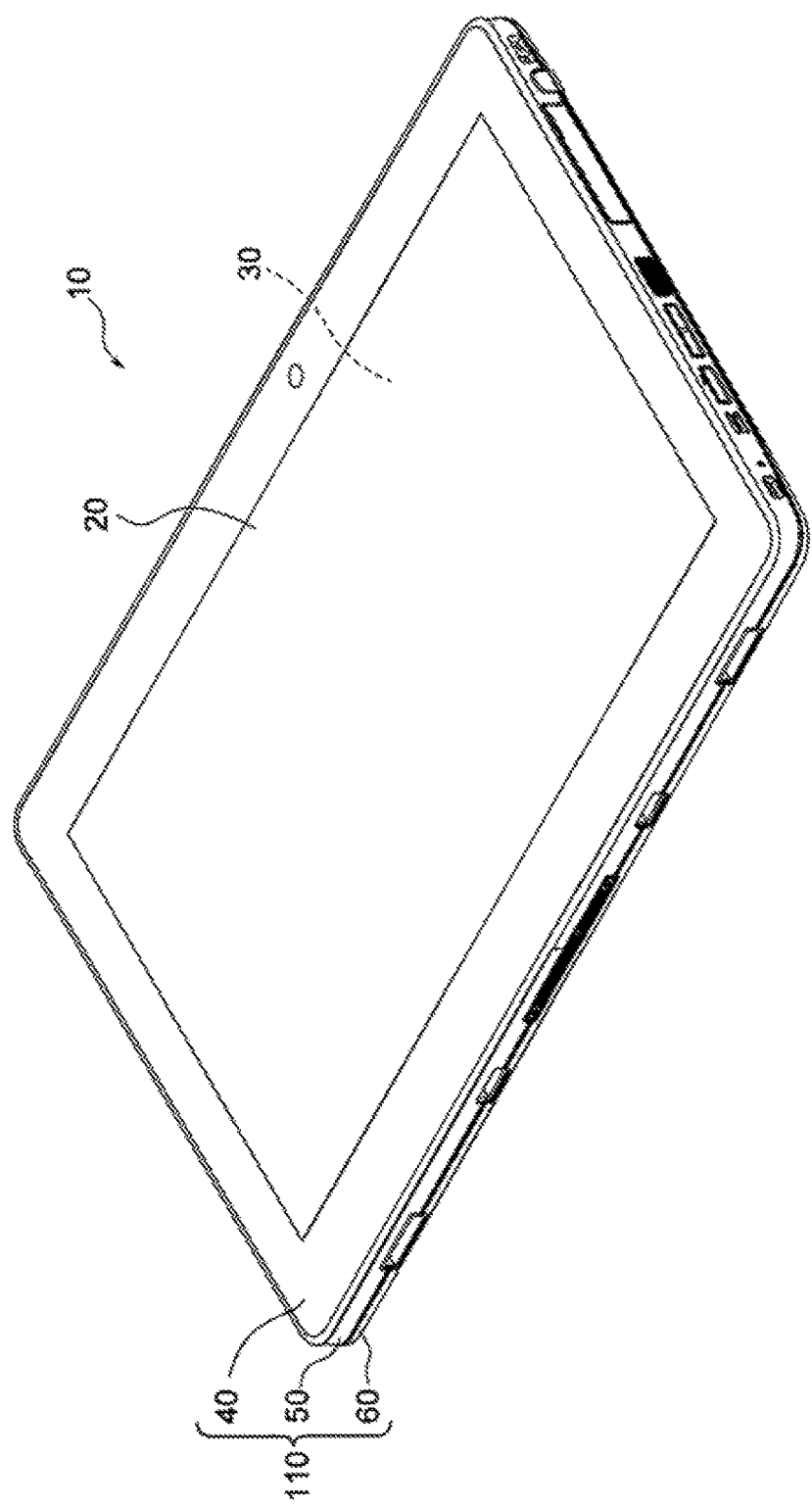
FIG. 1 is a perspective view of a display device of the present embodiment.
Figure 2:
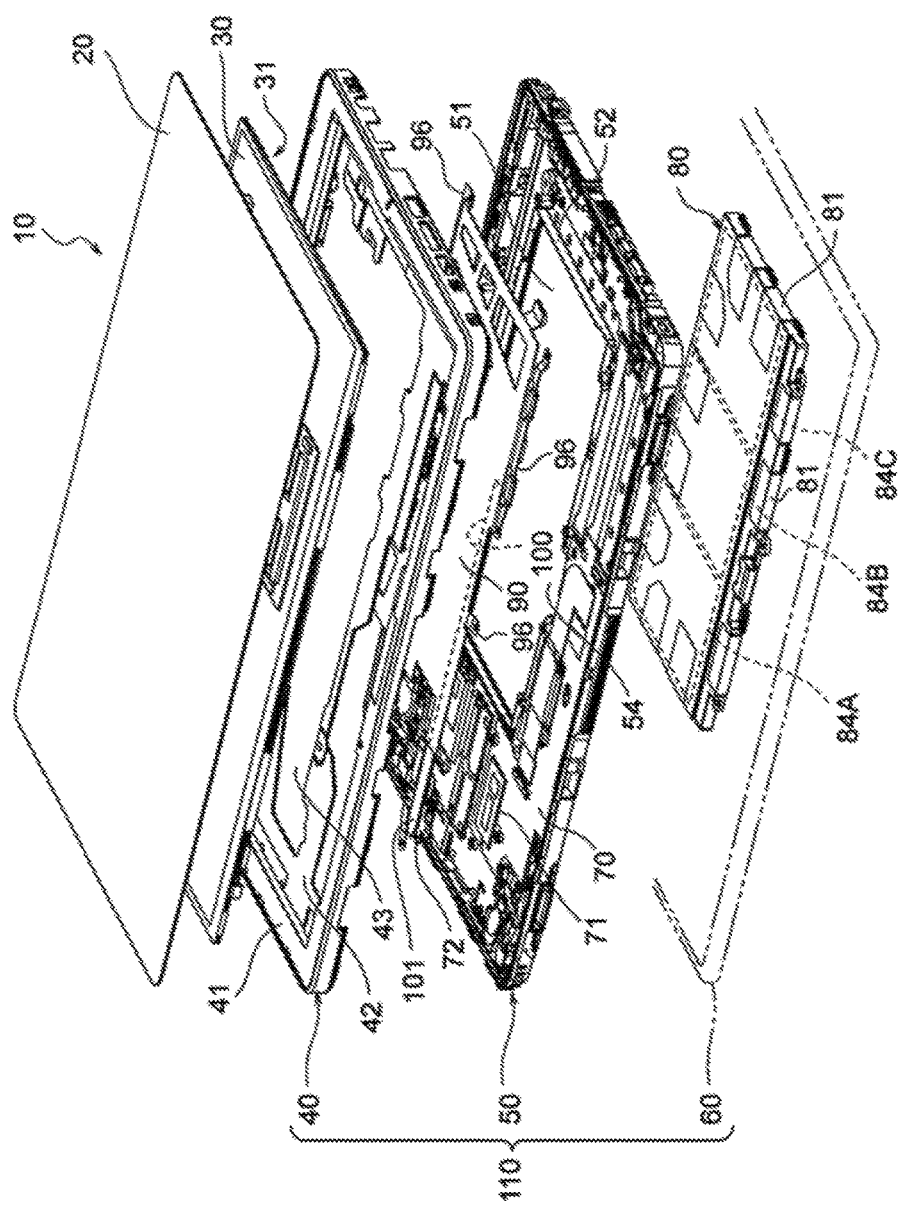
FIG. 2 is an exploded perspective view of the display device.

As illustrated in FIG. 1, a display device 10 of the present embodiment is, as an example, configured as a tablet terminal. As illustrated in FIG. 2, the display device 10 includes a touch panel 20, a display unit 30, an upper cover 40, a middle cover 50, a lower cover 60, a substrate 70, a battery unit 80, a radiator plate 90, and a heat pipe 100.

Both the touch panel 20 and the display unit 30 are formed in a quadrilateral tabular shape in plan view. For example, a liquid crystal display is used for the display unit 30, and a surface of the display unit 30 is covered by the touch panel 20.

The upper cover 40, the middle cover 50, and the lower cover 60 form a housing 110 of the display device 10. The housing 110 is formed in a quadrilateral and flat plate shape in plan view (see FIG. 1 as well).

The upper cover 40 includes a frame portion 41 that surrounds the display unit 30 and a support portion 42 formed on the inner side of the frame portion 41. The support portion 42 supports the display unit 30 from a back surface side of the display unit 30. An opening 43 that penetrates the support portion 42 in a thickness direction of the upper cover 40 is formed in the support portion 42, and the radiator plate 90 and the like described later are accommodated in the opening 43.

The middle cover 50 is disposed on a back surface side of the upper cover 40, and the lower cover 60 is disposed on a back surface side of the middle cover 50. The substrate 70 is mounted on a surface of the middle cover 50 on the upper cover 40 side. Furthermore, an accommodation portion 51 that has a shape similar to that of the battery unit 80 described later is formed in the middle cover 50. The accommodation portion 51 is open in a thickness direction of the middle cover 50, and the battery unit 80 is accommodated in the accommodation portion 51.

The battery unit 80 is an example of a "mounting unit" and is disposed on a back surface side of the display unit 30. The battery unit 80 is formed in a substantially quadrilateral and tabular shape in plan view and is disposed such that a thickness direction thereof is a direction normal to the back surface 31 of the display unit 30. The battery unit 80 is fixed to the middle cover 50 and the lower cover 60.

The battery unit 80 includes a plurality of lateral sides 81 (four lateral sides 81). A height direction of the plurality of lateral sides 81 is the direction normal to the back surface 31 of the display unit 30 and the plurality of lateral sides 81 extend in the direction normal to the back surface 31 (also see FIG. 9). Note that each of the lateral sides 81 may be orthogonal or inclined with respect to the back surface 31 of the display unit 30. A plurality of battery cells 84A, 84B, and 84C are built in the battery unit 80 and the plurality of battery cells 84A, 84B, and 84C are aligned in a direction in which the display unit 30 extends.

Figure 3:
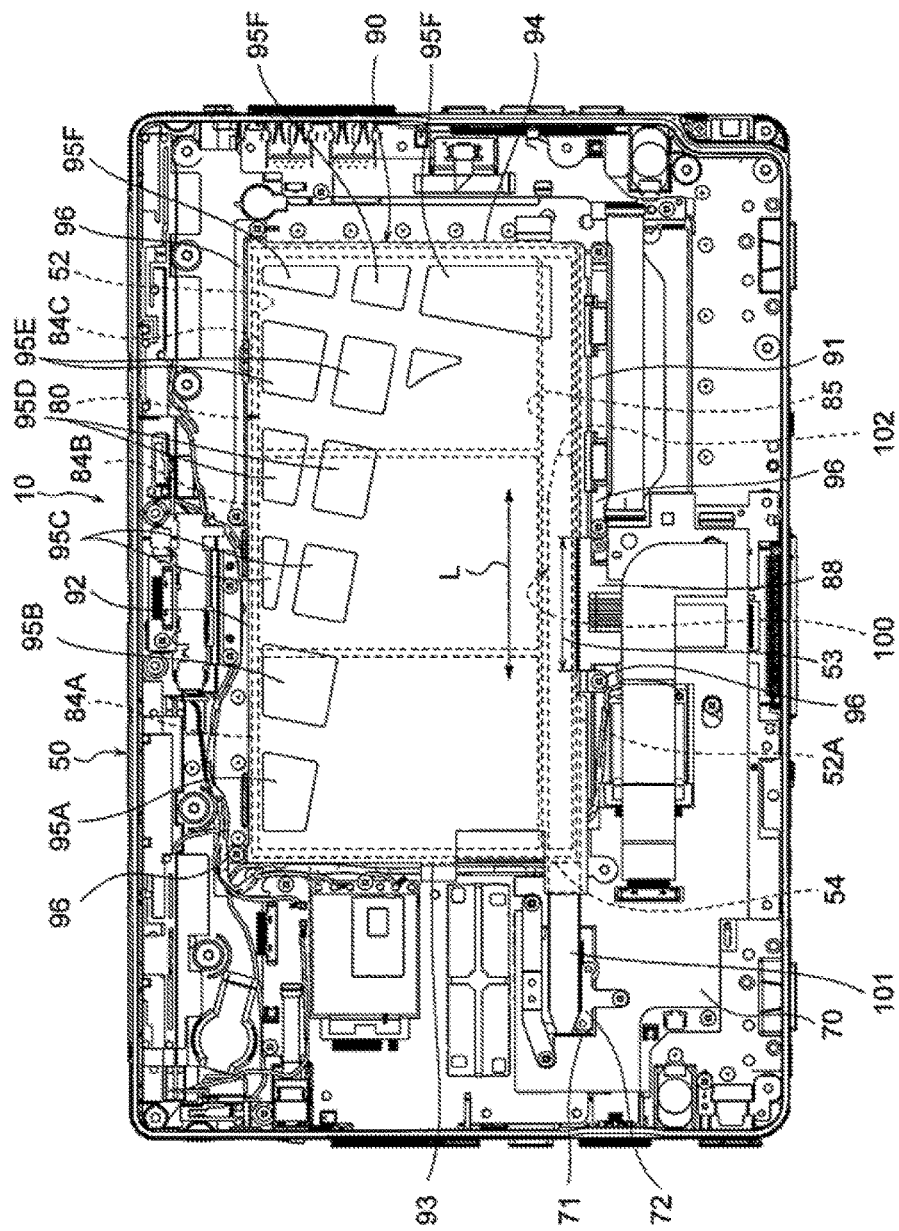
FIG. 3 is a plan view illustrating an inner configuration of the display device.
Figure 4:
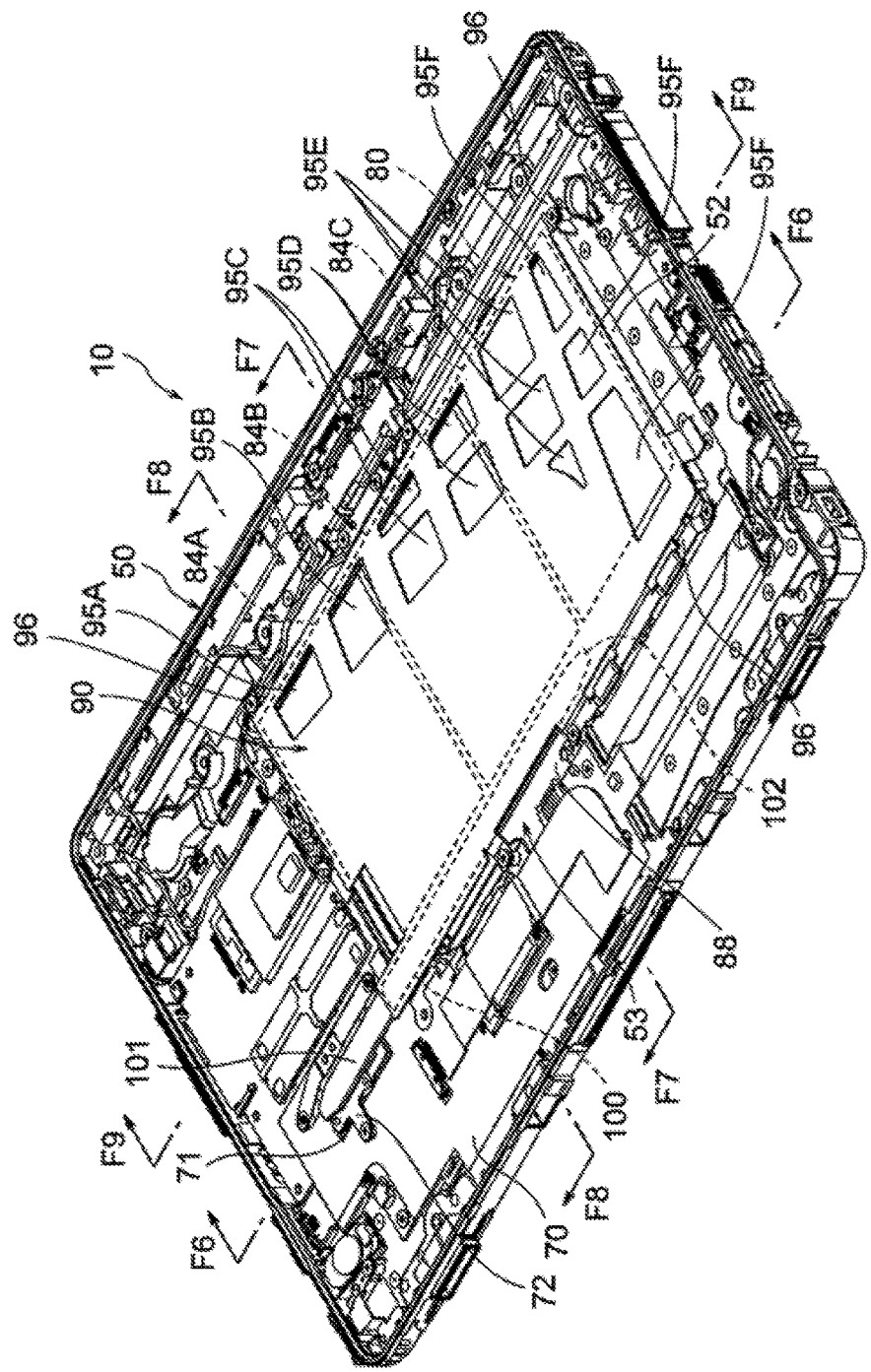
FIG. 4 is a perspective view illustrating an inner configuration of the display device.

Furthermore, an erect wall 52 serving as an example of an "erect portion" is formed in a peripheral portion of the accommodation portion 51 that accommodates the battery unit 80. The erect wall 52 is provided so as to erect towards the back surface 31 side of the display unit 30 and is formed in a wall-like shape. As illustrated in FIGS. 3 and 4, the erect wall 52 extends along the four lateral sides 81 of the battery unit 80 accommodated in the accommodation portion 51 and is disposed laterally with respect to the battery unit 80. The battery unit 80 is surrounded by the erect wall 52 when the battery unit 80 is accommodated in the accommodation portion 51.

The erect wall 52 may be formed in a continuous manner so as to extend in the circumferential direction (the direction in which the four lateral sides 81 continue) of the battery unit 80; however, in the present embodiment, the erect wall 52 is formed with a cutaway 53 (see FIG. 3) in a portion of the erect wall 52 in the circumferential direction. The cutaway 53 is open to the display unit 30 side. A cable 88 and the like that are led to extend from the battery unit 80 is accommodated in the cutaway 53, and the battery unit 80 is connected to the substrate 70 through the cable 88 and the like.

Figure 5:
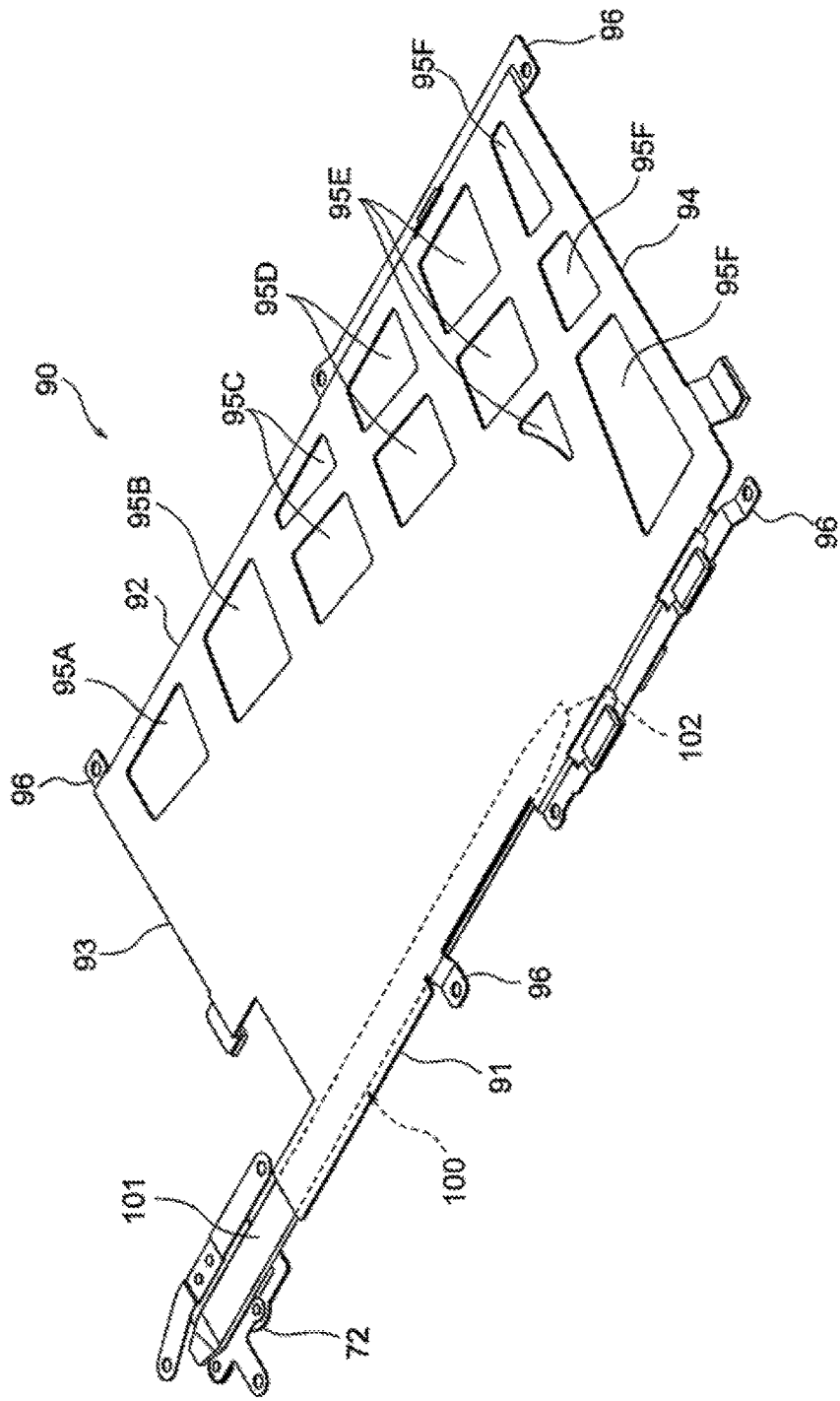
FIG. 5 is a perspective view of a radiator plate provided in the display device.
Figure 6:
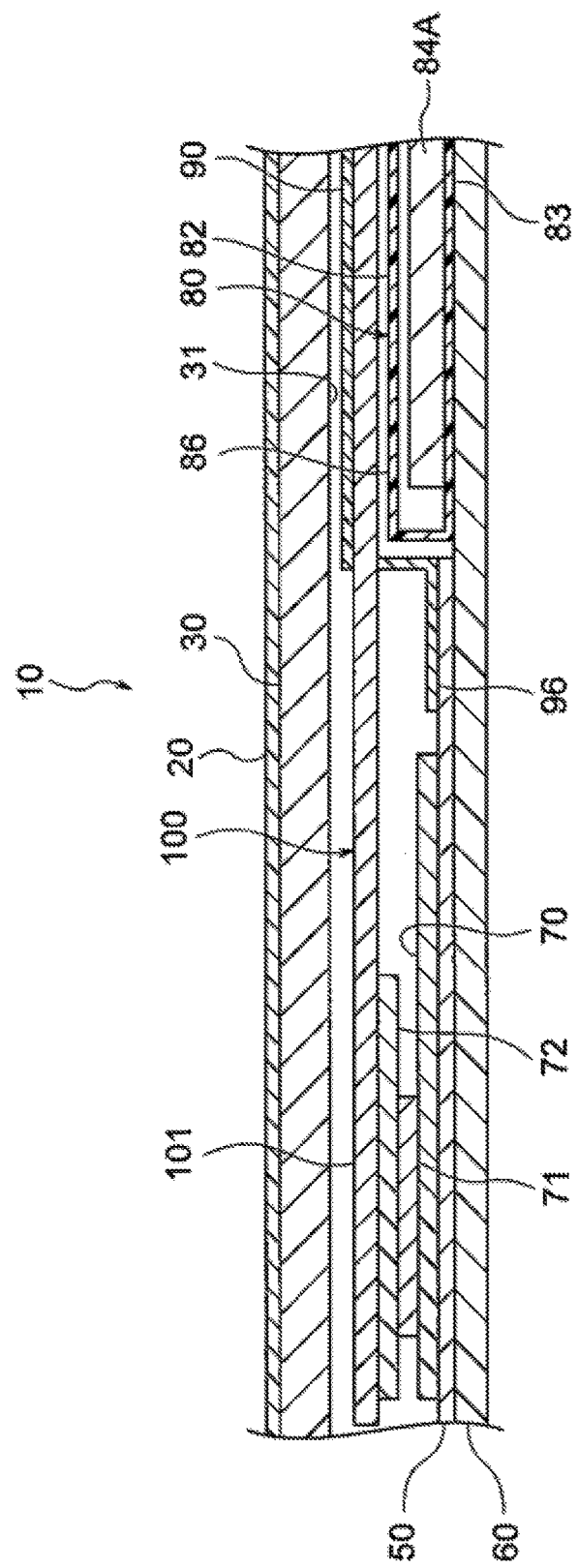
FIG. 6 is a cross-sectional view of the display device taken along line F6-F6 of FIG. 4.

The radiator plate 90 is an example of a "plate material" and is formed so as to have a substantially similar size and shape to that of the external shape of the erect wall 52 described above. As illustrated in FIG. 5, a plurality of fixing portions 96 are formed on an outer peripheral portion of the radiator plate 90. As illustrated in FIGS. 3 and 4, the radiator plate 90 is fixed to the middle cover 50 at the plurality of fixing portions 96 with screws.

FIGS. 6 to 9 illustrate cross-sectional views of FIG. 4 taken along lines F6-F6 to F9-F9. As illustrated in FIGS. 6 to 9, the radiator plate 90 is disposed between the display unit 30 and the battery unit 80 when fixed to the middle cover 50.

The radiator plate 90 opposes (faces) the back surface 31 of the display unit 30 through the opening 43 (see FIGS. 2, 8, and 9) formed in the upper cover 40 described above. The radiator plate 90 is desirably spaced apart from the back surface 31 of the display unit 30. Furthermore, the radiator plate 90 is provided so as to extend along a top surface 82 (a surface on the display unit 30 side) of the battery unit 80.

Figure 9:
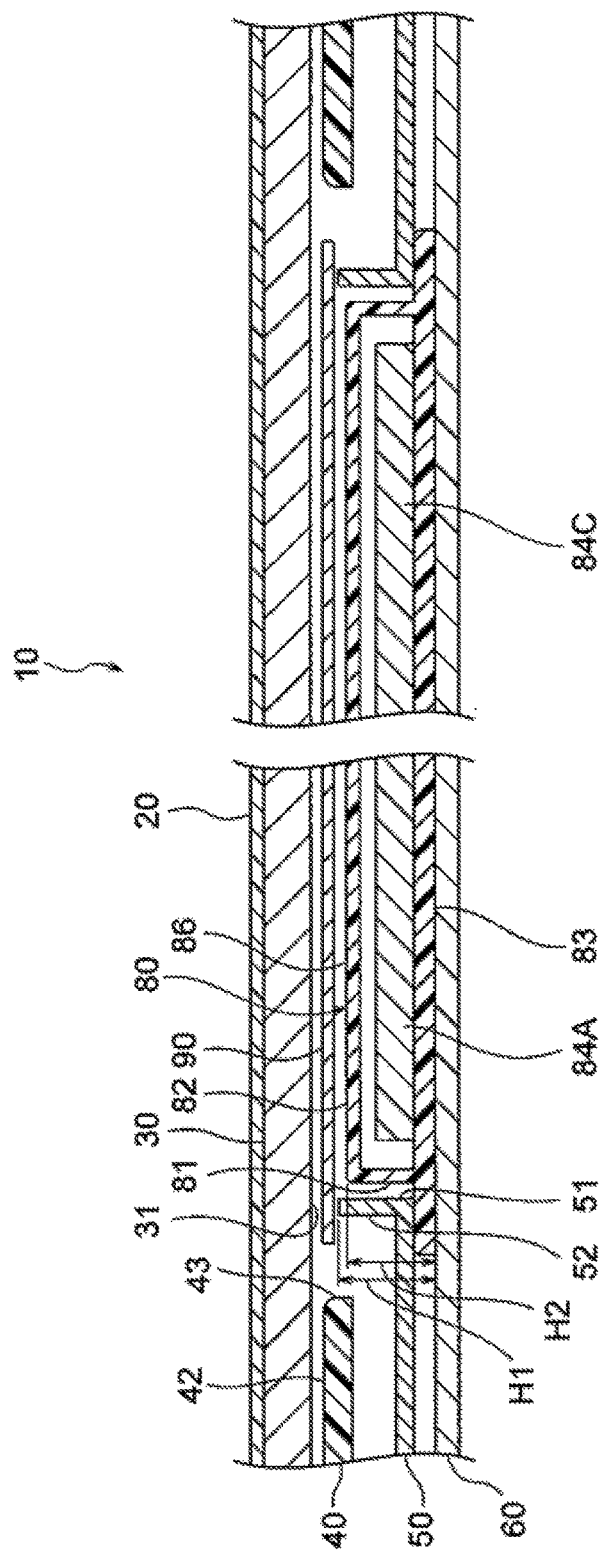
FIG. 9 is a cross-sectional view of the display device taken along line F9-F9 of FIG. 4.

As illustrated in FIG. 9, an upper portion of the erect wall 52 described above protrudes towards the display unit 30 side in a greater manner than the battery unit 80. The battery unit 80 is mounted on the lower cover 60, and a height H1 of the erect wall 52 from the lower cover 60 is greater than a height H2 of the top surface 82 of the battery unit 80 from the lower cover 60. A dimensional difference between the height H1 and the height H2 is set so as to be larger than an amount of expansion of the battery unit 80 in the thickness direction when the display device 10 is in use.

Furthermore, in order to avoid the erect wall 52 from abutting against the display unit 30, the radiator plate 90 described above is interposed between the back surface 31 of the display unit 30 and the upper portion of the erect wall 52. The upper portion of the erect wall 52 and the radiator plate 90 and desirably spaced apart from each other; however, they may be abutted against each other.

As illustrated in FIGS. 3 to 5, the radiator plate 90, more specifically, a pair of first edge portions 91 and 92 that extend in a direction in which the plurality of battery cells 84A, 84B, and 84C are aligned and a pair of second edge portions 93 and 94 that connect the pair of first edge portions 91 and 92 to each other, has a quadrilateral shape in plan view. The heat pipe 100 that extends in the direction in which the plurality of battery cells 84A, 84B, and 84C are aligned is connected to an underside (a surface on the battery unit 80 side) of the radiator plate 90.

The heat pipe 100 is disposed on the first edge portion 91 side among the pair of first edge portions 91 and 92 and extends along the first edge portion 91. One end 101 of the heat pipe 100 protrudes from the second edge portion 93. A heating element 71, such as a central processing unit (CPU), or the like for example is mounted on the substrate 70. The heating element 71 is thermally connected to the one end 101 of the heat pipe 100 through a heat spreader 72 (also, see FIG. 6).

Furthermore, the heat pipe 100 extends in a longitudinal direction of a wall portion 52A (a wall portion 52A that extends along the first edge portion 91 illustrated in FIG. 3) in the erect wall 52 in which the cutaway 53 is formed. Moreover, the heat pipe 100 overlaps the cutaway 53 in the longitudinal direction (an arrow L direction) of the wall portion 52A in the erect wall 52.

Furthermore, a plurality of openings 95A to 95F that align along the first edge portion 92 are formed in the radiator plate 90 to which the heat pipe 100 is connected. The plurality of openings 95A to 95F penetrate in the thickness direction of the radiator plate 90. The plurality of openings 95A to 95F are each formed so that the opening area gradually increases from the second edge portion 93 side towards the second edge portion 94 side.

In the present embodiment, the opening area of each of the plurality of openings 95A to 95F increases from the second edge portion 93 side towards the second edge portion 94 side; accordingly, the effective surface area of the radiator plate 90 gradually decreases from the one end side towards the other end side of the heat pipe 100. The effective surface area corresponds to an area of the radiation region (a region excluding the plurality of openings 95A to 95F) of the radiator plate 90 in plan view.

Figure 7:
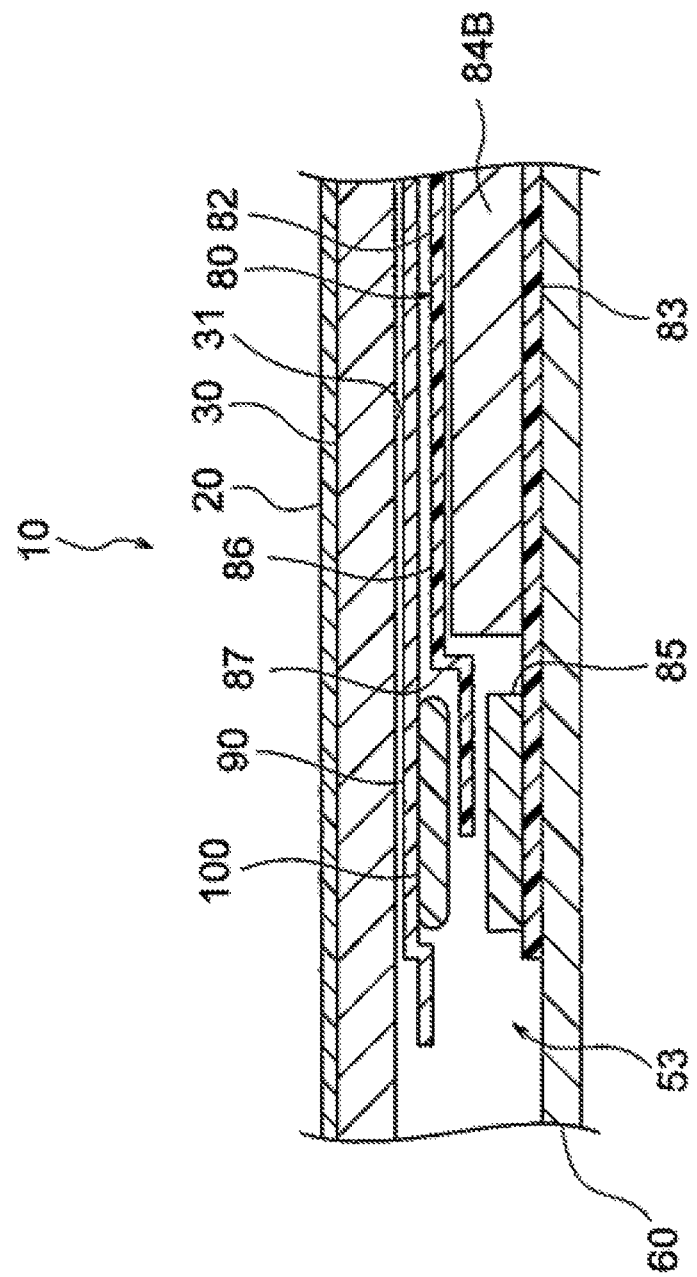
FIG. 7 is a cross-sectional view of the display device taken along line F7-F7 of FIG. 4.
Figure 8:
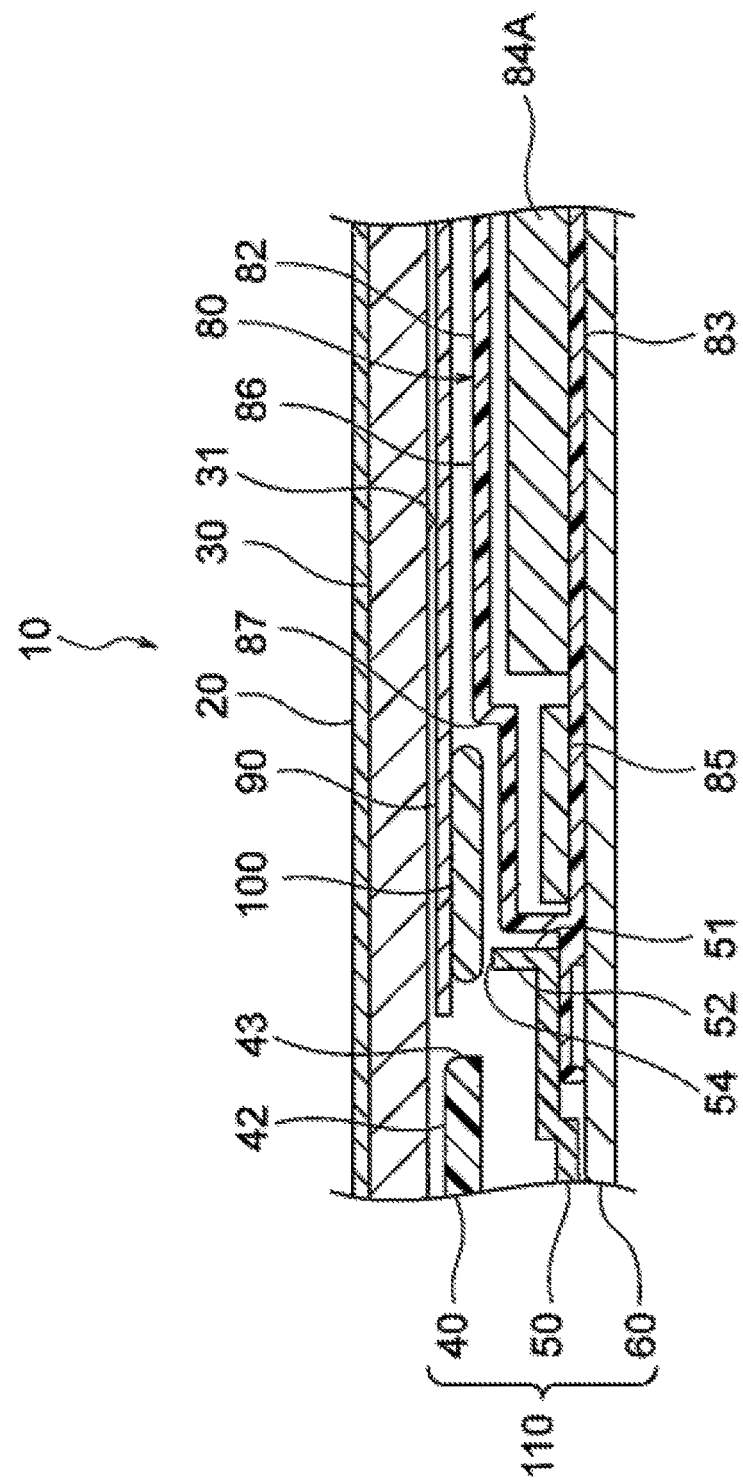
FIG. 8 is a cross-sectional view of the display device taken along line F8-F8 of FIG. 4.

Furthermore, as illustrated in FIGS. 7 and 8, more specifically, the battery unit 80 described above includes, other than the plurality of battery cells 84A, 84B, and 84C, a control board 85 and a battery case 86. The plurality of battery cells 84A, 84B, and 84C and the control board 85 are accommodated inside the battery case 86.

In the battery unit 80, by having a thickness of the control board 85 be smaller than a thickness of each of the battery cells 84A, 84B, and 84C, a step 87 is formed above the control board 85 in the thickness direction. Furthermore, the heat pipe 100 described above is disposed in the step 87. Furthermore, as illustrated in FIG. 8, a recess 54 open on the upper side of the erect wall 52 is formed in the erect wall 52. The heat pipe 100 described above is inserted in the recess 54. The heat pipe 100 and a bottom surface of the recess 54 are desirably spaced apart from each other; however, they may be abutted against each other.

Functions and effects of the present embodiment will be described next.

As described in detail above, according to the display device 10 of the present embodiment, the erect wall 52 that surrounds the battery unit 80 is formed in the peripheral portion of the accommodation portion 51 that accommodates the battery unit 80. Furthermore, as illustrated in FIG. 9, the upper portion of the erect wall 52 protrudes towards the display unit 30 side in a greater manner than the battery unit 80. Accordingly, the erect wall 52 secures a gap between the battery unit 80 and the display unit 30 and, therefore, even if the battery unit 80 were to expand in the thickness direction, the back surface 31 of the display unit 30 may be kept from being pushed by the battery unit 80.

Furthermore, the radiator plate 90 that opposes (faces) the back surface 31 of the display unit 30 is interposed between the display unit 30 and the erect wall 52. Accordingly, the erect wall 52 may be kept from directly abutting against the radiator plate 90 and, further, input from the erect wall 52 may be dispersed by the radiator plate 90 such that the input is transmitted as a surface load to the back surface 31 of the display unit 30. With the above, input of load in a local manner from the erect wall 52 to the back surface 31 of the display unit 30 may be reduced and, accordingly, damage to the display unit 30 may be reduced.

Furthermore, since the radiator plate 90 has both a heat radiating function that dissipates heat of the heating element 71 transmitted through the heat pipe 100 and an interference suppressing function that suppresses the erect wall 52 from interfering with the display unit 30, increase in the number of parts may be suppressed and the structure may be simplified.

Furthermore, as illustrated in FIGS. 7 and 8, in the battery unit 80, since the thickness of the control board 85 is smaller than the thickness of each of the battery cells 84A, 84B, and 84C, the step 87 is formed above the control board 85 in the thickness direction. Moreover, the heat pipe 100 is disposed in the step 87. Accordingly, the heat pipe 100 may be kept from bulging out towards the display unit 30 side and, as a result, the display unit 30 and the battery cells 84A, 84B, and 84C may be disposed closer to each other. With the above, the display device 10 may be made thinner.

Furthermore, the heat pipe 100 that connects the heating element 71 and the radiator plate 90 to each other is connected to the underside of the radiator plate 90 (the surface on the battery unit 80 side); accordingly, interference between the heat pipe 100 and the display unit 30 may be reduced and, consequently, input of load from the heat pipe 100 to the back surface 31 of the display unit 30 may be reduced.

Furthermore, since the erect wall 52 is formed so as to surround the battery unit 80 and serves as a reinforcing rib, the rigidity of the middle cover 50 may be improved.

Furthermore, as illustrated in FIG. 3, the heat pipe 100 extends in the longitudinal direction of the wall portion 52A (the wall portion 52A that extends along the first edge portion 91) in the erect wall 52 in which the cutaway 53 is formed. Moreover, the heat pipe 100 overlaps the cutaway 53 in the longitudinal direction (an arrow L direction) of the wall portion 52A in the erect wall 52. The rigidity of the erect wall 52 decreased due to the formation of the cutaway 53 may be compensated with the heat pipe 100 and, accordingly, the rigidity of the middle cover 50 in which the erect wall 52 is formed may be obtained.

Furthermore, since the plurality of openings 95A to 95F are formed in the radiator plate 90, the effective surface area gradually decreases from the one side to the other end side (the side away from the heating element 71) of the heat pipe 100. Accordingly, since the radiation amount of the radiator plate 90 on the side that is far from the heating element 71 is suppressed, heat may be transmitted to the plurality of battery cells 84A 84B, and 84C in an equal manner. As a result, a specific battery (especially the battery cell 84A that is close to the heating element 71) may be kept from being short in life due to high temperature and radiation may be performed in a wider area including the battery cell 84C that is on the far side with respect to the heating element 71; accordingly, efficiency of radiation may be improved.

Furthermore, the plurality of openings 95A to 95F that are formed in the radiator plate 90 is each formed so that the opening area gradually increases from one side to the other side of the pair of second edge portions 93 and 94 of the radiator plate 90. Accordingly, while reducing the weight of the radiator plate 90, heat may be transmitted to the plurality of battery cells 84A, 84B, and 84C in an equal manner with a simple configuration.

Modifications of the embodiments will be described next.

First Modification

Figure 10:
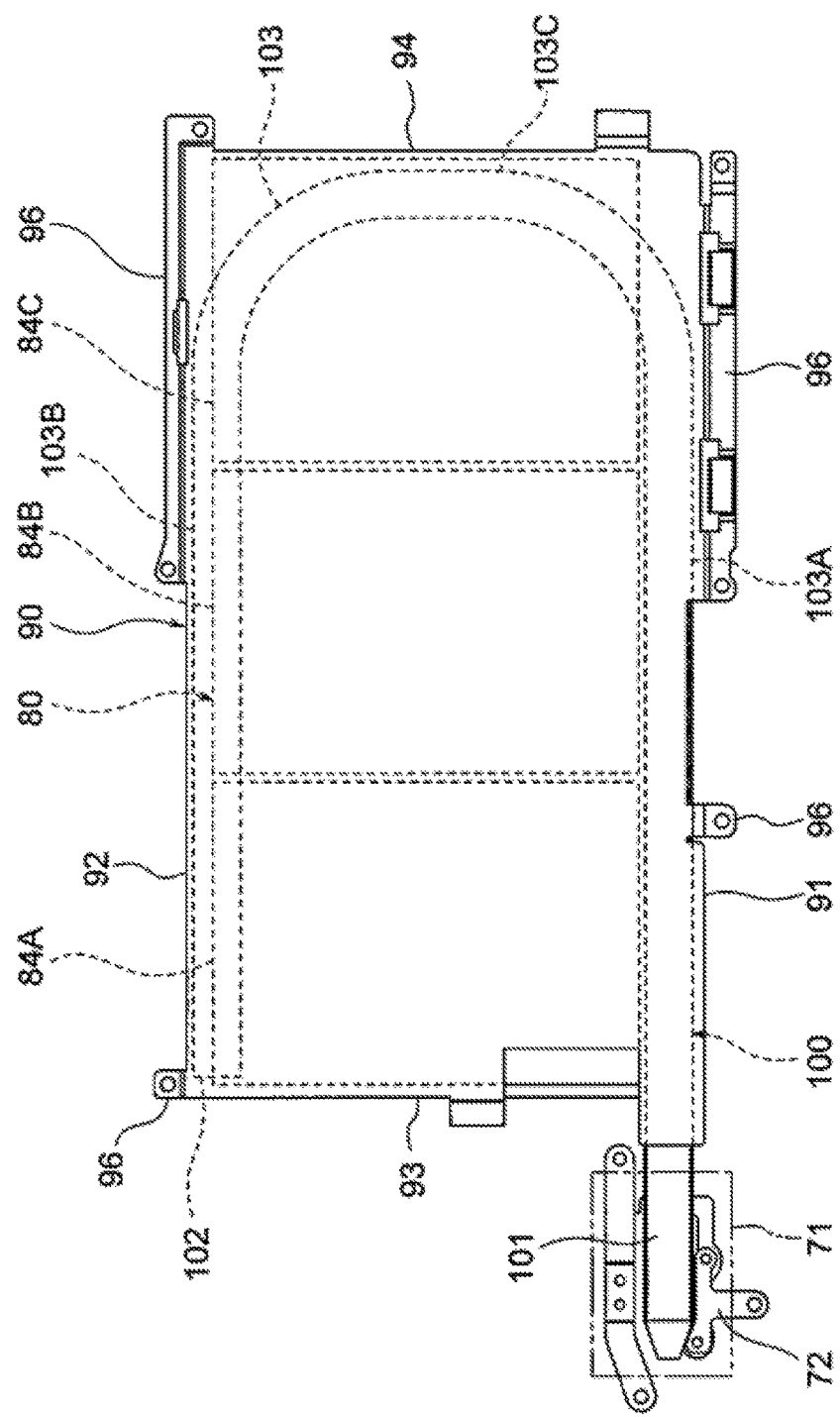
FIG. 10 is a diagram illustrating a first modification of the present embodiment.

In a first modification illustrated in FIG. 10, a U-shaped portion 103 is formed on the side that is on other end 102 with respect to the one end 101 of the heat pipe 100 such that the U-shaped portion 103 overlaps the plurality of battery cells 84A, 84B, and 84C in plan view. The U-shaped portion 103 has a U-shape that includes a pair of heat conduction portions 103A and 103B that each extend in the direction in which the plurality of battery cells 84A, 84B, and 84C are aligned, and a connection portion 103C that connects the pair of heat conduction portions 103A and 103B to each other.

In the heat pipe 100, the amount of heat conduction is decreased in order in the plurality of battery cells 84A, 84B, and 84C from the one end side towards the other end side. Accordingly, heat may be transmitted in an equal manner from the heat pipe 100 to the plurality of battery cells 84A, 84B, and 84C.

In other words, in the battery cell 84A that is on the side close to the heating element 71, while the amount of heat conduction from the heat conduction portion 103A is the largest, the amount of heat conduction from the heat conduction portion 103B is the smallest. Furthermore, in the battery cell 84B at the middle, while the amount of heat conduction from the heat conduction portion 103A is somewhat large, the amount of heat conduction from the heat conduction portion 103B is somewhat small. Furthermore, in the battery cell 84C that is on the side far from the heating element 71, while the amount of heat conduction from the heat conduction portion 103A is the smallest, the amount of heat conduction from the heat conduction portion 103B is the largest.

As described above, by forming the U-shaped portion on the other end side with respect to the one end 101 of the heat pipe 100, heat from the heat pipe 100 may be transmitted to the plurality of battery cells 84A, 84B, and 84C in an equal manner.

Second Modification

Figure 11:
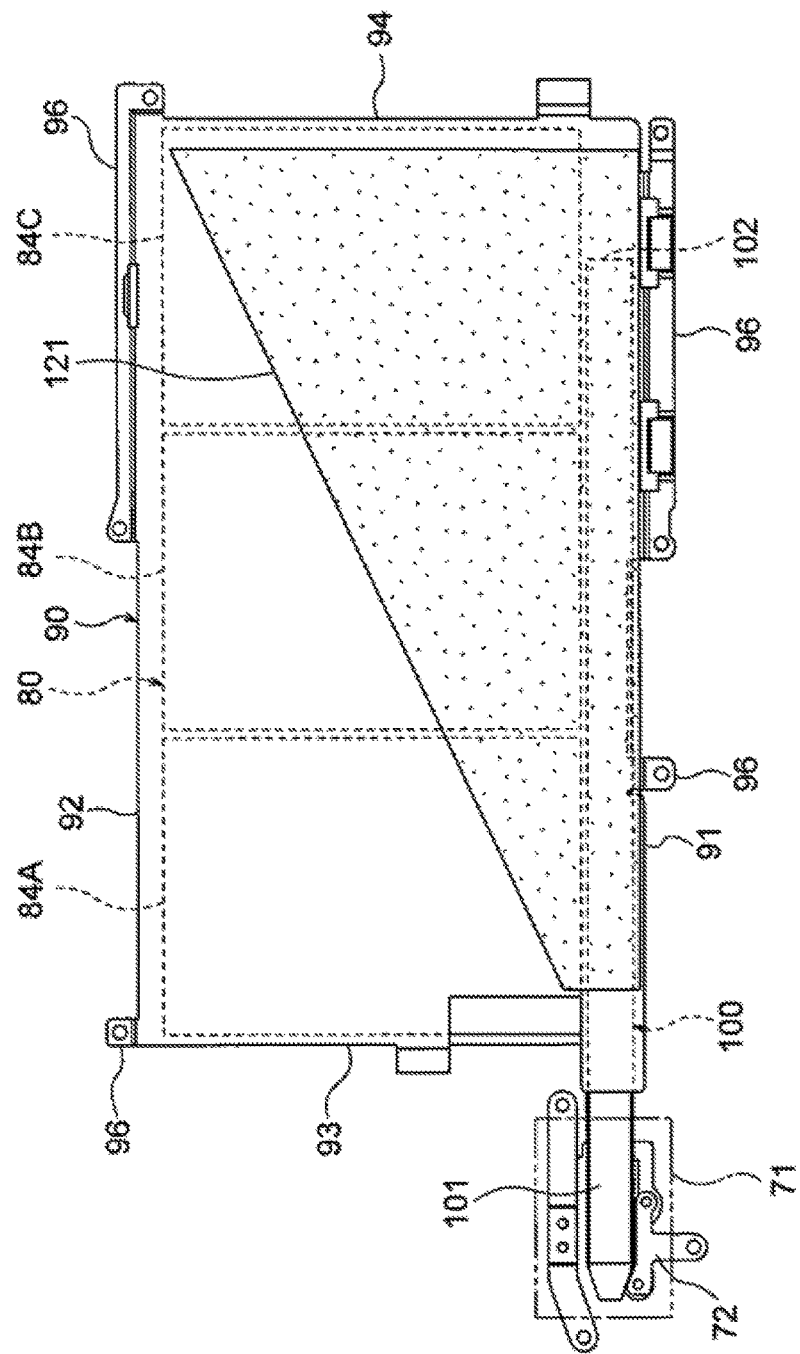
FIG. 11 is a diagram illustrating a second modification of the present embodiment.

Similar to the embodiment described above, in a second modification illustrated in FIG. 11, the heat pipe 100 extends in the direction in which the plurality of battery cells 84A, 84B, and 84C are aligned. Meanwhile, a thermal diffusion sheet 121, a lateral width of which increases as the thermal diffusion sheet 121 extends from one end 101 side towards the other end 102 side of the heat pipe 100, is adhered to the radiator plate 90. A graphite sheet, for example, is used as the thermal diffusion sheet 121.

Adhesion of the thermal diffusion sheet 121 to the radiator plate 90 enables heat from the heat pipe 100 to be transmitted to the plurality of battery cells 84A, 84B, and 84C in an equal manner.

Third Modification

Figure 12:
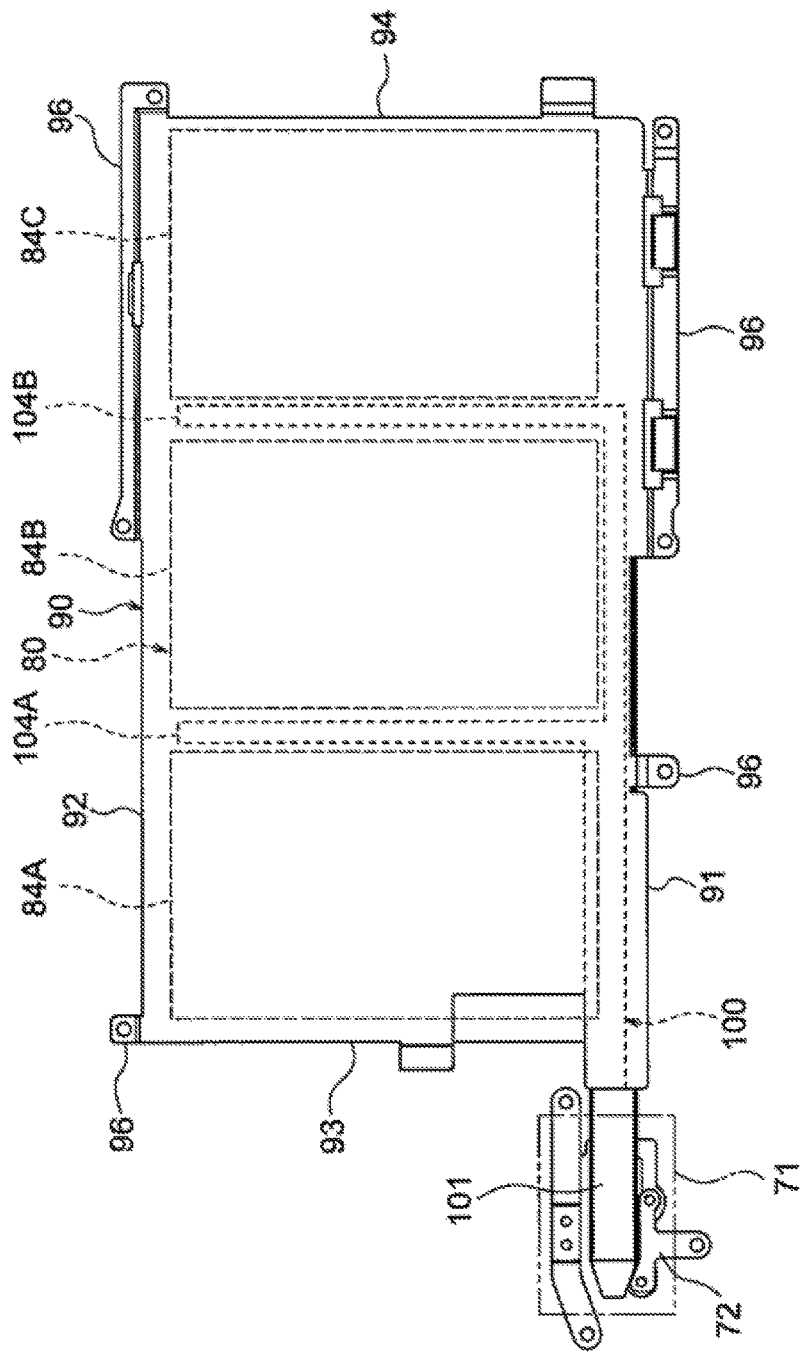
FIG. 12 is a diagram illustrating a third modification of the present embodiment.

In a third modification illustrated in FIG. 12, the other end side of the heat pipe 100 is branched into a plurality of branch portions 104A and 104B, and the plurality of branch portions 104A and 104B are disposed between the plurality of battery cells 84A, 84B, and 84C.

As described above, by disposing the plurality of branch portions 104A and 104B between the plurality of battery cells 84A, 84B, and 84C, heat from the heat pipe 100 may be transmitted to the plurality of battery cells 84A, 84B, and 84C in an equal manner.

Fourth Modification

Figure 13:
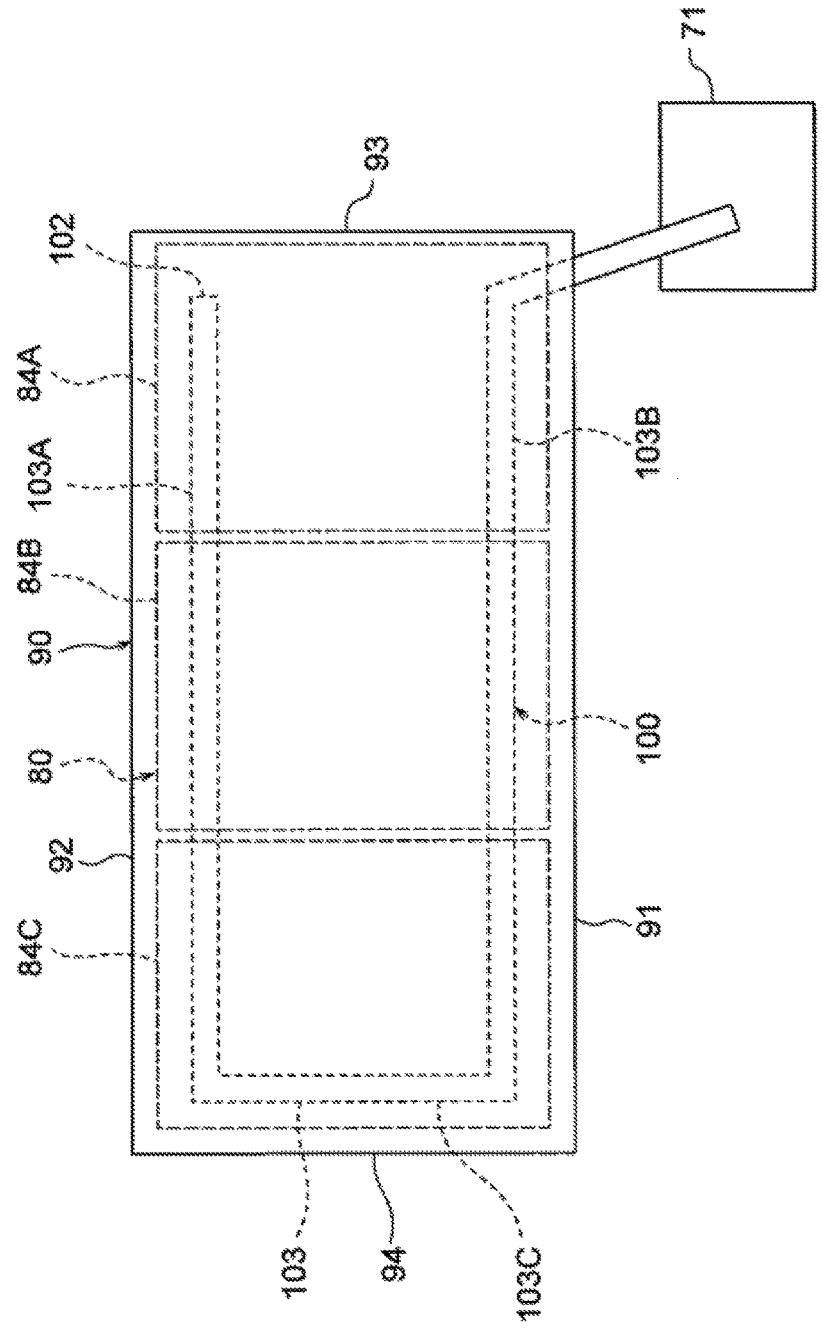
FIG. 13 is a diagram illustrating a fourth modification of the present embodiment.

Note that in the first modification (see FIG. 10) described above, the one end 101 of the heat pipe 100 protrudes from the second edge portion 93 formed in the radiator plate 90. However, as in a fourth modification illustrated in FIG. 13, the one end 101 of the heat pipe 100 may protrude from the second edge portion 93 side of the first edge portion 91 formed in the radiator plate 90.

Fifth Modification

Figure 14:
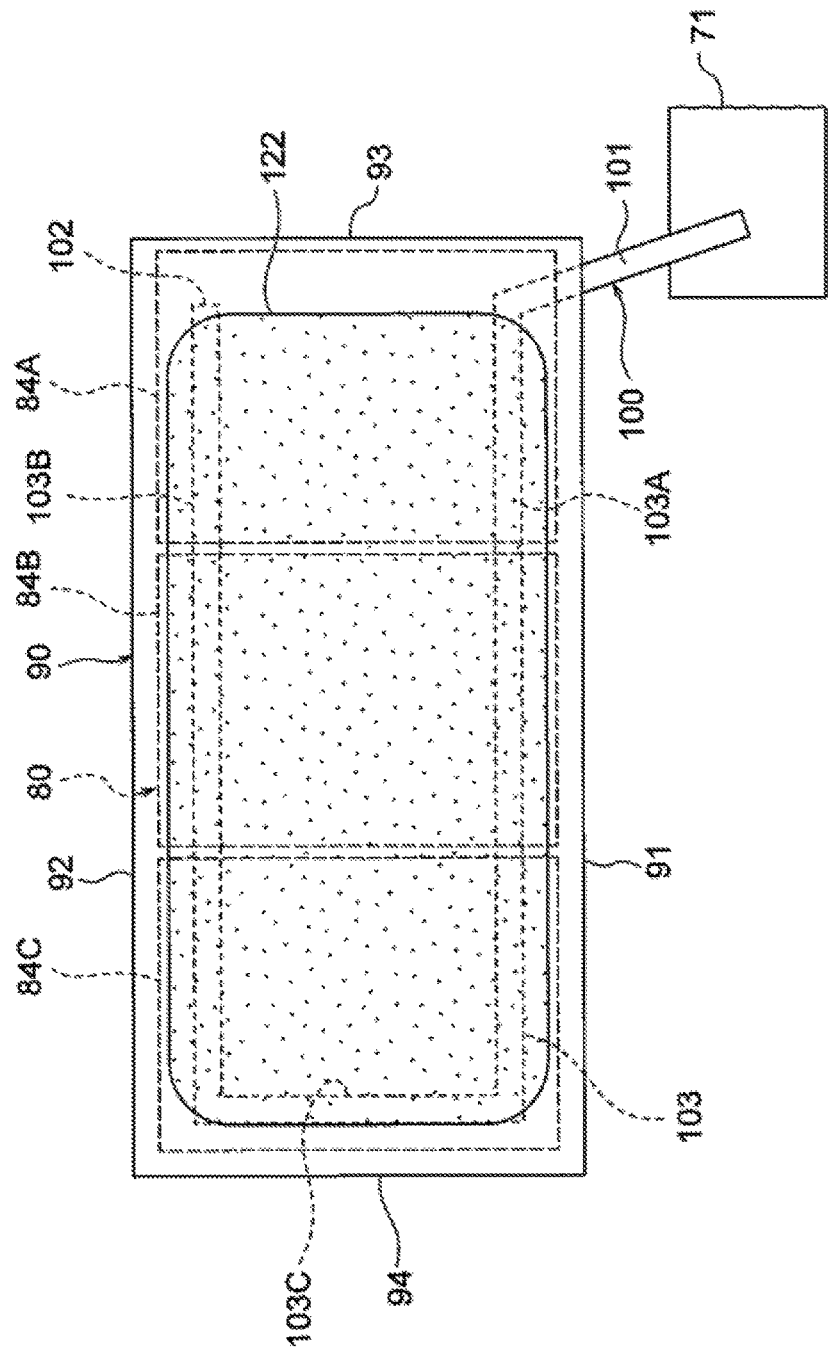
FIG. 14 is a diagram illustrating a fifth modification of the present embodiment.

In a fifth modification illustrated in FIG. 14, a thermal diffusion sheet 122 is added to the fourth modification (see FIG. 13) described above. A graphite sheet, for example, is used as the thermal diffusion sheet 122. The thermal diffusion sheet 122 is adhered to the upper surface (the surface on the display unit side) of the radiator plate 90 and covers the radiator plate 90. Furthermore, the thermal diffusion sheet 122 has a planar shape that is similar to that of the radiator plate 90 and is disposed so as to overlap the heat pipe 100 and the plurality of battery cells 84A, 84B, and 84C in plan view.

As described above, when the thermal diffusion sheet 122 is adhered to the radiator plate 90, heat from the heat pipe 100 may be transmitted to the plurality of battery cells 84A, 84B, and 84C in a further equal manner due to the thermal diffusion sheet 122.

Sixth Modification

Figure 15:
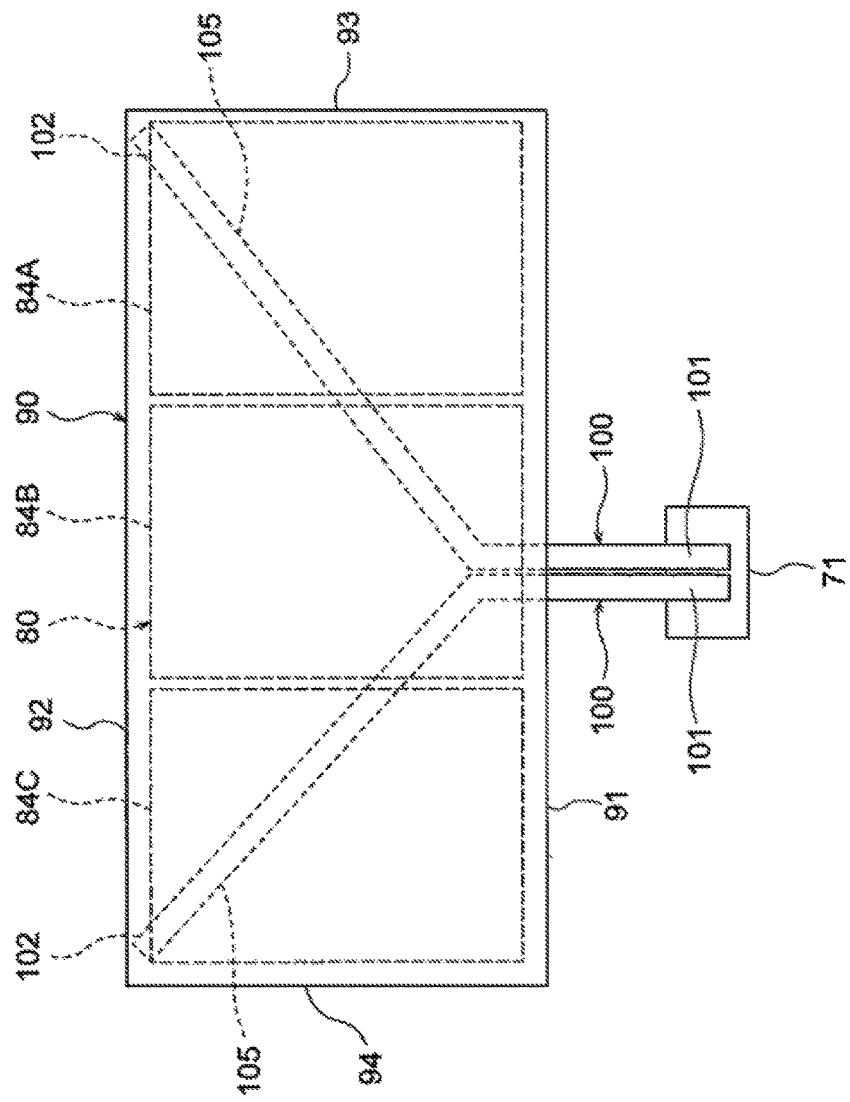
FIG. 15 is a diagram illustrating a sixth modification of the present embodiment.

In a sixth modification illustrated in FIG. 15, a pair of heat pipes 100 that are formed in a Y-shape is used. In one of the heat pipes 100, an inclination portion 105 that extends towards the second edge portion 93 as the inclination portion 105 extends from the first edge portion 91 towards the first edge portion 92 is formed. In a similar manner, in the other one of the heat pipes 100, an inclination portion 105 that extends towards the second edge portion 94 as the inclination portion 105 extends from the first edge portion 91 towards the first edge portion 92 is formed.

The inclination portion 105 of the one of the heat pipes 100 is disposed across the battery cell 84B (a first battery cell) at the middle and the battery cell 84A (one of a pair of second battery cells) disposed on one side of the battery cell 84B. Furthermore, the inclination portion 105 of the other one of the heat pipes 100 is disposed across the battery cell 84B (a first battery cell) at the middle and the battery cell 84C (the other of a pair of second battery cells) disposed on the other side of the battery cell 84B.

As described above, by using the pair of heat pipes 100 that are formed in a Y-shape, heat from the heat pipes 100 may be transmitted to the plurality of battery cells 84A, 84B, and 84C in an equal manner.

Seventh Modification

Figure 16:
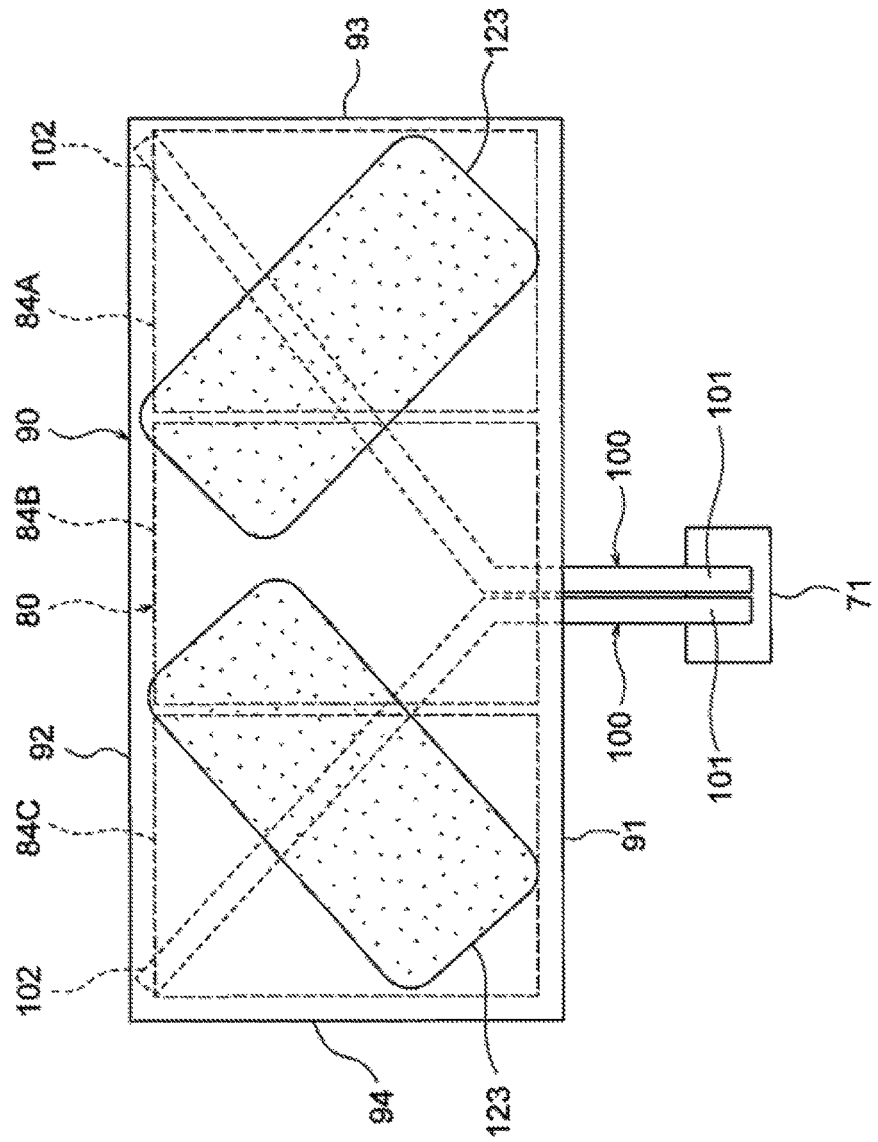
FIG. 16 is a diagram illustrating a seventh modification of the present embodiment.

In a seventh modification illustrated in FIG. 16, a pair of thermal diffusion sheets 123 are added to the sixth modification (see FIG. 15) described above. A graphite sheet, for example, is used as each of the thermal diffusion sheets 123. The pair of thermal diffusion sheets 123 are adhered to the upper surface (the surface on the display unit 30 side) of the radiator plate 90 and covers the radiator plate 90.

Furthermore, one of the thermal diffusion sheets 123 is disposed so as to overlap, in plan view, one of the inclination portions 105 of the heat pipes 100, the battery cell 84B in the middle, and the battery cell 84A disposed on one side of the battery cell 84B. Furthermore, the other one of the thermal diffusion sheets 123 is disposed so as to overlap, in plan view, the other one of the inclination portions 105 of the heat pipes 100, the battery cell 84B in the middle, and the battery cell 84C disposed on the other one side of the battery cell 84B.

As described above, when the pair of thermal diffusion sheets 123 are adhered to the radiator plate 90, heat from the heat pipes 100 may be transmitted to the plurality of battery cells 84A, 84B, and 84C in a further equal manner due to the thermal diffusion sheets 123.

Eighth Modification

Figure 17:
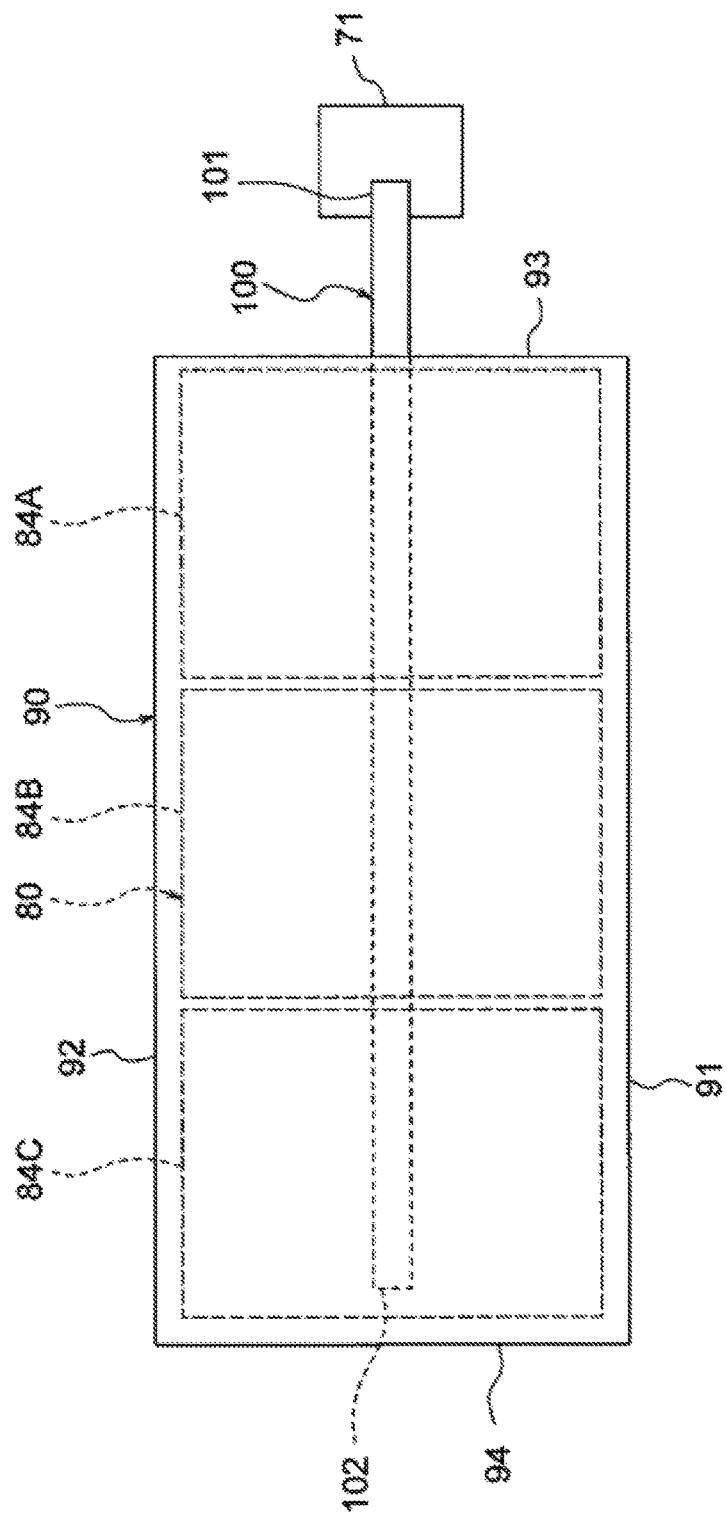
FIG. 17 is a diagram illustrating an eighth modification of the present embodiment.

In an eighth modification illustrated in FIG. 17, the heat pipe 100 extends in the direction in which the plurality of battery cells 84A, 84B, and 84C are aligned and passes through the middle portion of the plurality of battery cells 84A, 84B, and 84C in plan view.

With such a configuration, heat may be transmitted in an equal manner from the heat pipe 100 to the plurality of battery cells 84A, 84B, and 84C as well.

Ninth Modification

Figure 18:
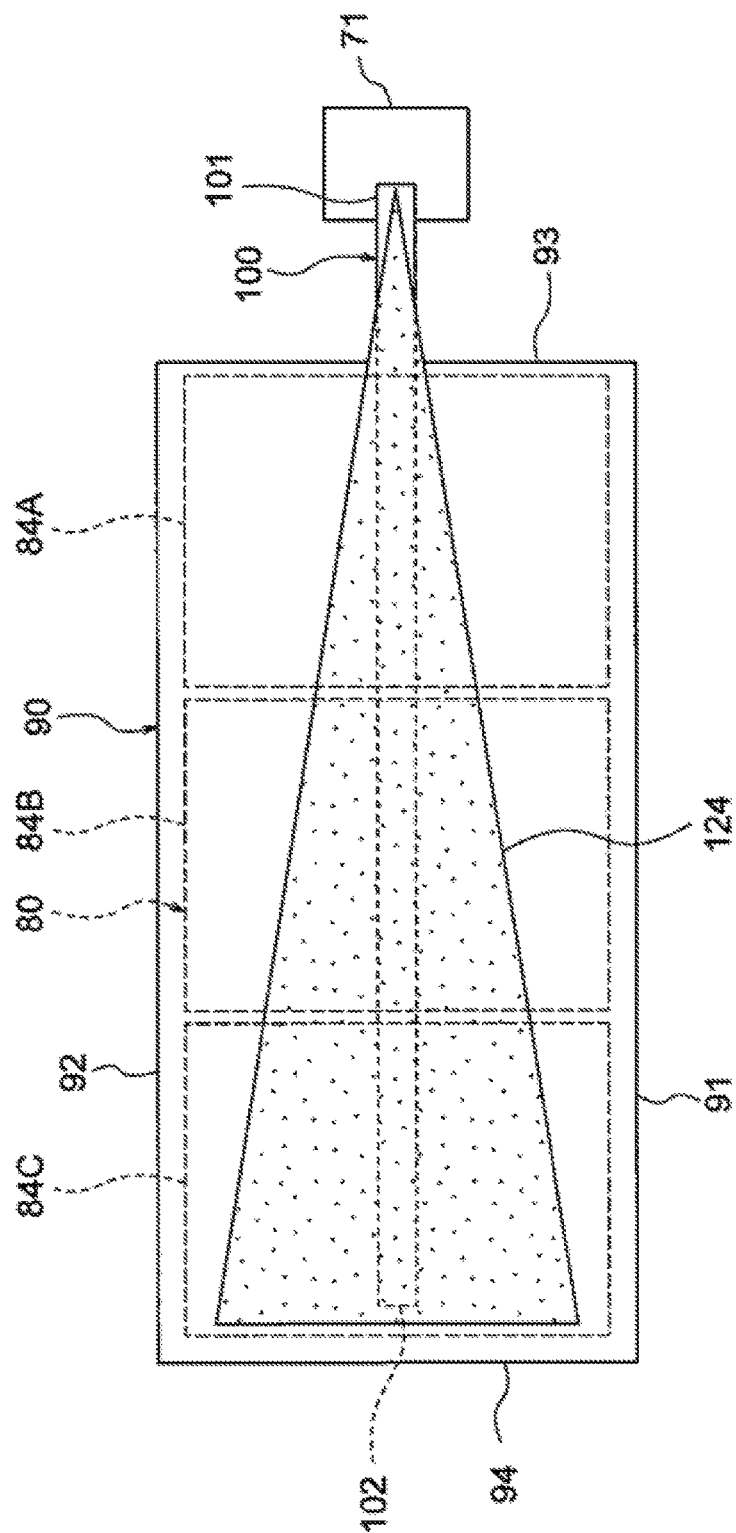
FIG. 18 is a diagram illustrating a ninth modification of the present embodiment.

In a ninth modification illustrated in FIG. 18, a thermal diffusion sheet 124 is added to the eighth modification (see FIG. 17) described above. A graphite sheet, for example, is used as the thermal diffusion sheet 124. The thermal diffusion sheet 124 is adhered to the upper surface (the surface on the display unit side) of the radiator plate 90 and covers the radiator plate 90.

Furthermore, the thermal diffusion sheet 124 has a planar shape that is similar to that of the radiator plate 90 and is disposed so as to overlap the heat pipe 100 and the plurality of battery cells 84A, 84B, and 84C in plan view. Moreover, the thermal diffusion sheet 124 extends in the longitudinal direction of the heat pipe 100 and is formed in a triangular or a trapezoidal shape, the lateral width thereof increasing from the one end 101 side towards the other end 102 side of the heat pipe 100.

As described above, when the thermal diffusion sheet 124 is adhered to the radiator plate 90, heat from the heat pipe 100 may be transmitted to the plurality of battery cells 84A, 84B, and 84C in a further equal manner due to the thermal diffusion sheet 124.

Tenth Modification

Figure 19:
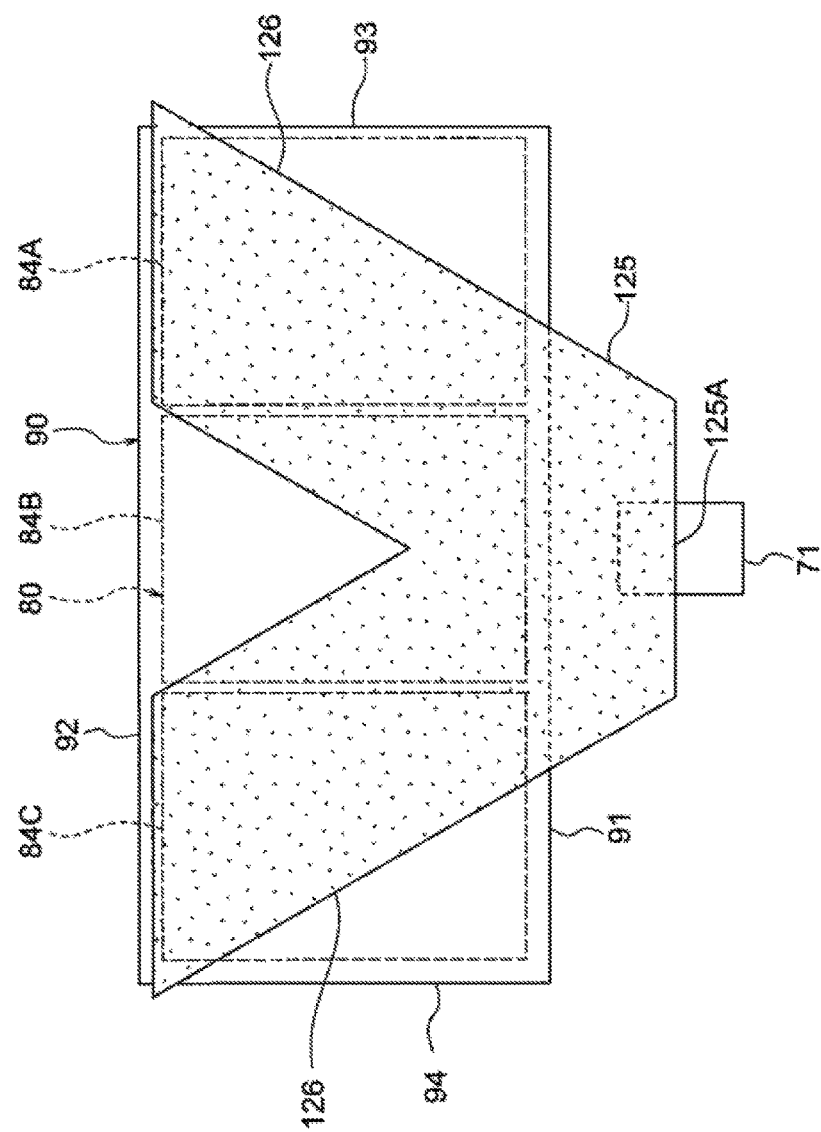
FIG. 19 is a diagram illustrating a tenth modification of the present embodiment.

In a tenth modification illustrated in FIG. 19, a thermal diffusion sheet 125 is used instead of the heat pipe(s) 100 (see FIGS. 10 to 18). A graphite sheet, for example, is used as the thermal diffusion sheet 125. The thermal diffusion sheet 125 is adhered to the upper surface (the surface on the display unit 30 side) of the radiator plate 90 and covers the radiator plate 90.

Furthermore, the thermal diffusion sheet 125 is formed in a substantially V-shape that includes a pair of inclination portions 126 and is disposed so as to overlap the plurality of battery cells 84A, 84B, and 84C in plan view. One of the inclination portions 126 is inclined towards the second edge portion 93 as the one of the inclination portions 126 extends from the first edge portion 91 towards the first edge portion 92. In a similar manner, the other one of the inclination portions 126 is inclined towards the second edge portion 94 as the other one of the inclination portions 126 extends from the first edge portion 91 towards the second edge portion 94. One end 125A of the thermal diffusion sheet 125 is thermally connected to the heating element 71.

As described above, even when the thermal diffusion sheet 125 is used instead of the heat pipe, heat from the heating element 71 may be transmitted to the plurality of battery cells 84A, 84B, and 84C in an equal manner.

Other Modifications

In the embodiment described above, a tablet terminal is given as an example of the display device 10; however, the display device 10 may be another device, such as a note type personal computer, a smartphone, or a cellular phone.

Furthermore, in the embodiment described above, the battery unit 80 is used as an example of the "mounting unit"; however, a hard disk drive (HDD) unit or an optical disk drive (ODD) unit may be used.

Furthermore, in the embodiment described above, the erect wall 52 desirably has a shape that surrounds the battery unit 80; however, the erect wall 52 may not be formed to have a shape that surrounds the battery unit 80. Furthermore, a plurality of erect walls 52 that are spaced apart in the circumferential direction of the battery unit 80 may be provided. Furthermore, the erect wall 52 is formed in the middle cover 50; however, the erect wall 52 may be formed in a member other than the middle cover 50.

Furthermore, in the embodiment described above, while a wall-like erect wall 52 is provided as an example of the "erect portion", an erect portion having a shape other than the wall shape may be provided.

Note that among the plurality of modifications described above, modifications that may be combined with each other may be combined in an appropriate manner.

A description of a referential example will be given next.

Figure 20:
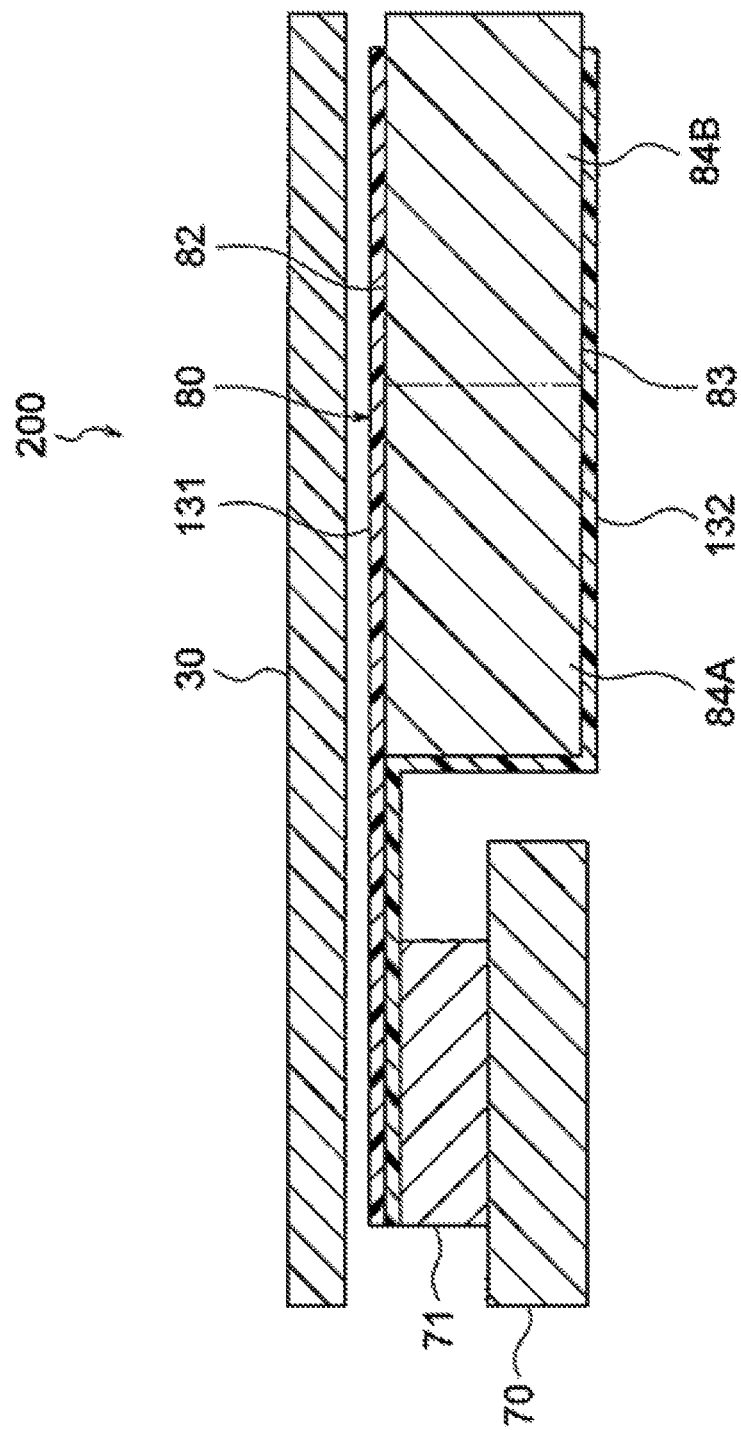
FIG. 20 is a diagram illustrating a referential example of the display device.

A display device 210 according to a referential example illustrated in FIG. 20 is changed in structure with respect to the embodiment described above in the following manner. In other words, in the referential example, a first thermal diffusion sheet 131 and a second thermal diffusion sheet 132 are used instead of the heat pipe(s) 100 described above. A graphite sheet, for example, is used as each of the first thermal diffusion sheet 131 and the second thermal diffusion sheet 132.

The first thermal diffusion sheet 131 is adhered to the top surface 82 of the battery unit 80 and is thermally connected to the heating element 71. The second thermal diffusion sheet 132 is adhered to the bottom surface 83 of the battery unit 80 and is thermally connected to the heating element 71. Furthermore, the first thermal diffusion sheet 131 and the second thermal diffusion sheet 132 are disposed so as to overlap the plurality of battery cells 84A and 84B in plan view.

As described above, even when the first thermal diffusion sheet 131 and the second thermal diffusion sheet 132 are used instead of the heat pipe, heat from the heating element 71 may be transmitted to the plurality of battery cells 84A and 84B in an equal manner.

A description has been given of the embodiment of the technique disclosed in the present application; however, the technique disclosed in the present application is not limited to the above and it goes without saying that various modifications may be made without departing from the spirit and scope of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A display device comprising:
an upper cover;
a plate-shaped display;
a battery disposed on a back surface side of the display, the battery includes a plurality of battery cells that align in a direction in which the display extends;
a wall that includes a cutaway section and the wall extends towards the back surface side of the display along a lateral side of the battery, the wall protruding towards the back surface side of the display in a distance greater than a planar thickness of the battery when the battery is housed in the cutaway section;
a radiator plate that extends along a surface of the battery facing the display so as to cover the battery and the cutaway section when the battery is housed in the cutaway section, opposes the back surface side of the display, and that is interposed between the display and the wall;
a pair of heat pipes connected to the radiator plate, each of the pair of heat pipes including a first end thermally connected to a heating element; and
a lower cover located below the battery,
wherein the plurality of battery cells includes a first battery cell that is disposed in a middle of the plurality of battery cells, and a pair of second battery cells disposed on both sides of the first battery cell,
wherein one of the pair of heat pipes is disposed across the first battery cell and one of the pair of second battery cells, and
wherein other one of the pair of heat pipes is disposed across the first battery cell and other one of the pair of second battery cells.

2. The display device according to claim 1, further comprising:
a support portion that supports the back surface side of the display,
wherein an opening that accommodates the radiator plate is formed in the support portion.

3. A display device comprising:
an upper cover;
a plate-shaped display;
a battery disposed on a back surface side of the display, the battery includes a plurality of battery cells that align in a direction in which the display extends;
a wall that includes a cutaway section and the wall extends towards the back surface side of the display along a lateral side of the battery, the wall protruding towards the back surface side of the display in a distance greater than a planar thickness of the battery when the battery is housed in the cutaway section;
a radiator plate that extends along a surface of the battery facing the display so as to cover the battery and the cutaway section when the battery is housed in the cutaway section, opposes the back surface side of the display, and that is interposed between the display and the wall;
a heat pipe connected to the radiator plate, the heat pipe including a first end thermally connected to a heating element; and
a lower cover located below the battery,
wherein an effective surface area of the radiator plate decreases while extending from one end side towards other end side of the heat pipe,
wherein the radiator plate has a quadrilateral shape in plan view that includes a pair of first edge portions that extend in the direction in which the plurality of battery cells are aligned, and a pair of second edge portions that connect the pair of first edge portions to each other,
wherein the heat pipe extends in a direction in which the plurality of battery cells are aligned and along one of the pair of first edge portions,
wherein the first end of the heat pipe protrudes from one of the pair of second edge portions,
wherein a plurality of openings are formed in the radiator plate, the plurality of openings being aligned along other one of the pair of first edge portions, and
wherein opening areas of the plurality of openings increase as the plurality of openings extend from a side on one of the pair of second edge portions towards a side on other one of the pair of second edge portions.

4. The display device according to claim 3,
wherein the heat pipe extends in a longitudinal direction of the wall and overlaps the cutaway section in the longitudinal direction of the wall.

5. A display device comprising:
a plate-shaped display;
a battery disposed on a back surface side of the display, the battery including a plurality of battery cells that align in a direction in which the display extends;
a wall that extends towards the back surface side of the display along a lateral side of the battery, the wall protruding towards the back surface side of the display in a distance greater than a planar thickness of the battery;
a radiator plate that extends along a surface of the battery facing the display, opposes the back surface side of the display, and that is interposed between the display and the wall; and
a heat pipe connected to the radiator plate, the heat pipe including a first end thermally connected to a heating element and a second end comprising a plurality of branch portions disposed between the plurality of battery cells.

6. The display device according to claim 5, further comprising:
a first thermal diffusion sheet that is adhered to a first surface of the battery and that is thermally connected to the heating element; and
a second thermal diffusion sheet that is adhered to a second surface of the battery, opposite to the first surface, and that is thermally connected to the heating element.

7. The display device according to claim 6, further comprising:
a support portion that supports the back surface side of the display,
wherein an opening that accommodates the radiator plate is formed in the support portion.

8. A display device comprising:
a plate-shaped display;
a battery disposed on a back surface side of the display, the battery including a plurality of battery cells that align in a direction in which the display extends;
a wall that extends towards the back surface side of the display along a lateral side of the battery, the wall protruding towards the back surface side of the display in a distance greater than a planar thickness of the battery;
a radiator plate that extends along a surface of the battery facing the display, opposes the back surface side of the display, and that is interposed between the display and the wall; and
a heat pipe connected to the radiator plate,
wherein the battery includes a battery cell and a control board that is disposed laterally with respect to the battery cell,
wherein a thickness of the control board is smaller than a thickness of the battery cell so as to form a step above the control board in a thickness direction of the control board, and
wherein the heat pipe is provided in the step.

* * * * *